United States Patent
Kushner et al.

(10) Patent No.: US 12,038,902 B2
(45) Date of Patent: *Jul. 16, 2024

(54) DATA STRUCTURES FOR COMPUTATIONALLY EFFICIENT DATA PROMULGATION AMONG DEVICES IN DECENTRALIZED NETWORKS

(71) Applicant: Wells Fargo Bank, N.A., San Francisco, CA (US)

(72) Inventors: Kristine Ing Kushner, Orinda, CA (US); John T. Wright, Benicia, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/141,915

(22) Filed: May 1, 2023

(65) Prior Publication Data
US 2023/0273913 A1 Aug. 31, 2023

Related U.S. Application Data

(63) Continuation of application No. 17/563,809, filed on Dec. 28, 2021, now Pat. No. 11,669,511, which is a continuation of application No. 16/794,059, filed on Feb. 18, 2020, now Pat. No. 11,249,976.

(51) Int. Cl.
*G06F 16/25* (2019.01)
*G06F 16/23* (2019.01)
*G06F 16/2455* (2019.01)

(52) U.S. Cl.
CPC ...... *G06F 16/2358* (2019.01); *G06F 16/2455* (2019.01); *G06F 16/252* (2019.01)

(58) Field of Classification Search
CPC . G06F 16/2358; G06F 16/2455; G06F 16/252
USPC ........................................ 707/703
See application file for complete search history.

(56) References Cited

U.S. PATENT DOCUMENTS

| | | | |
|---|---|---|---|
| 5,907,704 A | * | 5/1999 | Gudmundson ......... G06F 16/94 717/123 |
| 6,581,063 B1 | | 6/2003 | Kirkman |
| 6,990,513 B2 | | 1/2006 | Belfiore et al. |

(Continued)

*Primary Examiner* — Hanh B Thai
(74) *Attorney, Agent, or Firm* — Foley & Lardner LLP

(57) ABSTRACT

Disclosed are approaches for computationally-efficient data promulgation among devices in a network. Structured databases may comprise standardized and immutable bytes, each byte linked to a unique data field, a mutable state element, and a mutable activation element. The state element may indicate that there has been a mutation as well as a recency of the mutation. The activation element may indicate whether data pushes and/or data pulls are enabled. The state elements are configured to automatically mutate if there is a mutation in a corresponding unique data field. Each device in the network may transmit API calls as state-element requests to other entity devices in a network. The API call includes at least one byte, without any values in corresponding data fields. State elements are promulgated among devices, without sharing the data fields themselves. An optional central system maintains a record of state elements without storing data field values.

14 Claims, 8 Drawing Sheets

(56) References Cited

U.S. PATENT DOCUMENTS

| | | | |
|---|---|---|---|
| 7,299,408 B1* | 11/2007 | Daconta | G06Q 50/16 |
| | | | 715/234 |
| 7,613,722 B2 | 11/2009 | Horvitz et al. | |
| 7,788,403 B2 | 8/2010 | Darugar et al. | |
| 7,869,425 B2 | 1/2011 | Elliott et al. | |
| 7,921,463 B2 | 4/2011 | Sood et al. | |
| 8,194,646 B2 | 6/2012 | Elliott et al. | |
| 8,281,293 B2* | 10/2012 | Fulton | G06F 9/4493 |
| | | | 717/153 |
| 8,543,665 B2 | 9/2013 | Ansari et al. | |
| 8,644,484 B2 | 2/2014 | Fulton et al. | |
| 9,256,761 B1 | 2/2016 | Sahu et al. | |
| 9,881,176 B2 | 1/2018 | Goldfarb et al. | |
| 9,984,252 B2 | 5/2018 | Pollard | |
| 10,229,097 B2 | 3/2019 | Cudich et al. | |
| 10,375,188 B2 | 8/2019 | Gutman et al. | |
| 10,839,320 B2 | 11/2020 | Augustine et al. | |
| 10,868,674 B2 | 12/2020 | Beecham et al. | |
| 11,620,391 B2* | 4/2023 | LeMay | G06F 21/64 |
| | | | 713/190 |
| 2003/0131142 A1 | 7/2003 | Horvitz et al. | |
| 2006/0233180 A1 | 10/2006 | Serghi et al. | |
| 2007/0076885 A1 | 4/2007 | Sood et al. | |
| 2007/0121596 A1 | 5/2007 | Kurapati et al. | |
| 2008/0033845 A1 | 2/2008 | McBride et al. | |
| 2010/0082546 A1* | 4/2010 | Sreenivas | G06F 16/221 |
| | | | 707/E17.005 |
| 2013/0268357 A1 | 10/2013 | Heath | |
| 2015/0074259 A1 | 3/2015 | Ansari et al. | |
| 2016/0062954 A1* | 3/2016 | Ruff | G06F 40/205 |
| | | | 715/249 |
| 2016/0182416 A1 | 6/2016 | Rathod | |
| 2017/0255663 A1 | 9/2017 | Woschitz et al. | |
| 2017/0364698 A1* | 12/2017 | Goldfarb | G06F 16/9024 |
| 2017/0364700 A1* | 12/2017 | Goldfarb | H04L 9/3247 |
| 2018/0309631 A1 | 10/2018 | Li et al. | |
| 2019/0116047 A1 | 4/2019 | Struttmann et al. | |
| 2019/0171838 A1 | 6/2019 | Struttmann | |
| 2019/0288850 A1* | 9/2019 | Beecham | G06F 21/6209 |
| 2019/0306173 A1 | 10/2019 | Reddy et al. | |
| 2020/0125501 A1 | 4/2020 | Durham et al. | |
| 2020/0125770 A1* | 4/2020 | LeMay | H04L 9/3242 |
| 2021/0117611 A1* | 4/2021 | Liu | H03M 7/4031 |

* cited by examiner

DATA STRUCTURES FOR COMPUTATIONALLY EFFICIENT DATA PROMULGATION AMONG DEVICES IN DECENTRALIZED NETWORKS

CROSS-REFERENCE TO RELATED APPLICATIONS

This application is a continuation of U.S. patent application Ser. No. 17/563,809 filed Dec. 28, 2021, which is a continuation of U.S. patent application Ser. No. 16/794,059 filed Feb. 18, 2020, the entirety of each of which is incorporated herein by reference.

TECHNICAL FIELD

The present disclosure relates to data structures that enable effective promulgation of data among devices in decentralized networks with enhanced computational efficiency.

BACKGROUND

The information shared with other entities often varies for different individuals and organizations, depending on context (relationship between entities, industry, objective, use, etc.). Certain user data of a person may change over time, but this change may, intentionally or otherwise, be revealed to certain entities and not others. Also, the same data may be characterized differently, making the data more difficult to manage. Sharing, updating, and maintaining user data tends to be computationally inefficient, and can be fragmented, inconsistent, unreliable, and out of the user's control.

SUMMARY

Various embodiments of the disclosure relate to a method implemented by a first device of a first entity. The method may include generating a first structured database comprising a standardized set of immutable bytes by linking each immutable byte to a unique data field, to a mutable activation element, and to a mutable state element, wherein generating the structured database comprises configuring the first structured database such that a mutation to a unique data field automatically triggers a mutation to a corresponding state element; overwriting a first unique data field with user data received from a remote user device of a user, thereby triggering a first mutation to a first state element corresponding to the first unique data field linked to a first byte; accepting, from a second device of a second entity via internet communications, a first API call comprising the first byte in the set of immutable bytes, wherein the first API call does not include a value for a corresponding unique data field stored in a second structured database maintained by the second device; querying the first structured database to determine, for the first byte, that a first activation element corresponding to the first byte enables state data pulls from the second device of the second entity and to retrieve the first state element linked to the first byte included in the first API call; transmitting via internet communications, to the second device in response to the first API call, the first state element without transmitting the first unique data field linked to the first byte in the first structured database; generating a second API call comprising a second byte in the set of immutable bytes and transmitting the second API call to a third device of a third entity, wherein the second API call does not include a value for a corresponding second unique data field linked to the second byte; accepting, from the third device in response to the second API call and via internet communications, a second state element stored in a third structured database maintained by the third device; comparing the second state element from the third structured database with a third state element corresponding to the second byte in the first structured database; transmitting, to the user device, a request for a new value corresponding to the second unique data field based on the comparison; accepting, from the user device, the new value corresponding to the second unique data field; and overwriting the second unique data field with the new value received from the user device thereby triggering a second mutation to a third state element corresponding to the second unique data field linked to the second byte.

Various other embodiments of the disclosure also relate to a method implemented by a first device of a first entity. The method may include generating a first structured database comprising a standardized set of immutable bytes by linking each immutable byte to a unique data field, to a mutable activation element, and to a mutable state element that is configured such that a unique data field mutation automatically triggers a corresponding state element mutation; transmitting, to a first cyberspace destination of a user, an electronic message and determining that the electronic message encountered a delivery error; identifying a first unique data field that comprises the cyberspace destination and that is linked to a first byte in the first structured database; determining that the first byte is linked to an activation element that enables data pulls from a second device of a second entity; transmitting, to the second device, a first API call that comprises the first byte but that does not comprise a value for the first unique data field; accepting, from the second device in response to the API call, a second-device state element from a second structured database maintained by the second device, the second-device state element linked to the first byte in the second structured database; determining that the second-device state element satisfies a mutation criterion for the second byte; requesting from the user device, in response to determining the mutation criterion is satisfied, data corresponding to the first unique data field; accepting user data from the user device and determining that the user data comprises a second cyberspace destination different from the first cyberspace destination; overwriting the first unique data field with the user data from the user device and triggering a mutation in the first state element linked to the first byte in the structured database; and transmitting, to the second cyberspace destination, a second electronic message indicating the first unique data field has been updated.

Various embodiments of the disclosure relate to a computing system. The computing system may include a structured database comprising, for each entity in a set of entities, a standardized set of immutable bytes each linked to a unique data field, to a mutable activation element, and to a mutable state element, the structured database configured such that a unique data field mutation automatically triggers a corresponding state element mutation; a processor and a memory comprising instructions executable by the processor and configured to cause the computing system to: present a graphical user interface to a remote user device of a user to enable the user to select, via the graphical user interface, which entities in the set of entities are granted data pull rights; accept, via the graphical user interface, a first selection to disable data pulls for a first entity and a second selection to enable data pulls for a second entity; update the structured database such that one or more activation elements corresponding to the first entity are disabled and such that one or more activation elements corresponding to the second entity are enabled; accept, from a first device of the first entity, a first API call comprising a first byte as a first state element request, wherein the first API call does not include a value for the first byte's corresponding unique data field; query the structured database to determine that, for the first entity, the first byte is linked with a first activation element that does not enable data pulls from the first entity; transmit, to the first device in response to the API call, a denial of the state element request based on the determination that the first activation element does not enable data pulls from the first entity; accept, from a second device of the second entity, a second API call comprising a second byte as a second state element request, wherein the second API call does not include a value for the second byte's corresponding unique data field; query the structured database to determine that, for the second entity, the second byte is linked with a second activation element that enables data pulls from the second entity; transmit, to the second device in response to the API call, a second state element corresponding to the second byte; accept, from a third device of a third entity, a state element push comprising a third byte and a third state element corresponding to the third byte; compare the third state element from the third device with the third byte's state element in the structured database; transmit, to a user device, a request for a new value for the third byte's corresponding unique data field; accept, from the user device, the new value corresponding to the third byte's corresponding unique data field; and overwrite the third byte's corresponding unique data field with the new value received from the user device thereby triggering a mutation to the third byte's linked state element in the structured database.

These and other features, together with the organization and manner of operation thereof, will become apparent from the following detailed description and the accompanying drawings.

DETAILED DESCRIPTION

Figure 1:
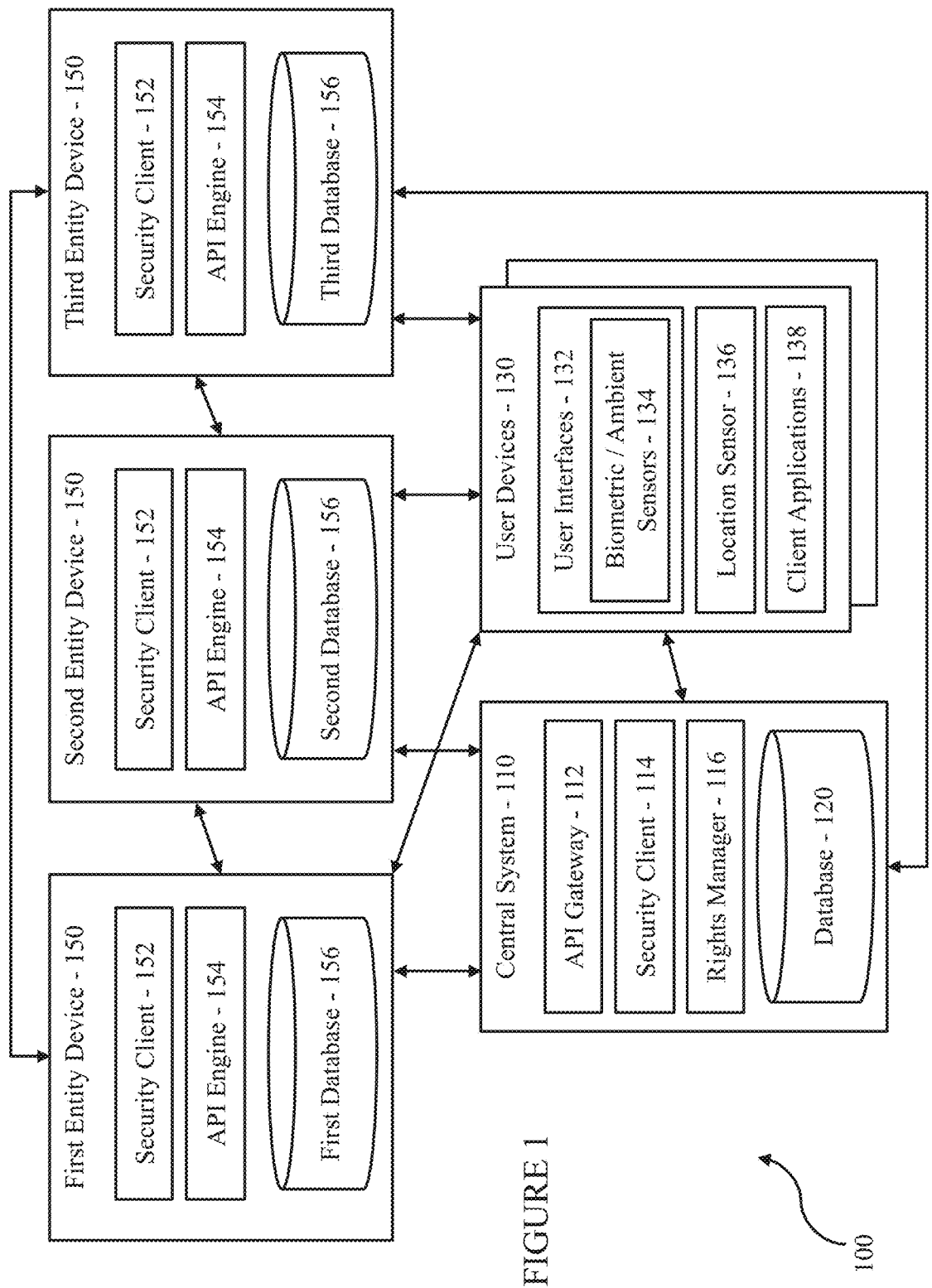
FIG. 1 is a block diagram of an example system comprising a decentralized network of entity devices that may communicate with user devices and a central system, according to various potential embodiments.

Various embodiments described herein relate to systems and methods for more computationally-efficient data promulgation among devices in a network. A piece of information with respect to an individual, organization, or other entity (collectively referred to as a user) may change, but typically, the user may only share the new information with certain entities. This may be because the user does not want certain entities to have the new piece of information, or this may be because the user waits to provide updated information to entities until a subsequent interaction requires it. This leaves many entities without the most up-to-date information of users, and/or requires the user to expend a significant amount of time proactively communicating with each entity to share the new information. In certain potential arrangements, a user may provide all of his or her information to one entity, and that entity may share the information with others. However, the user may wish to only authorize certain entities to receive specific information. As each piece of information can be classified, categorized, contextualized, or otherwise characterized in different ways, it would require the entity to undergo the computationally intensive (and likely futile) process of analyzing each piece of information to assign a suitable characterization for the information for all contexts so that the information can be shared only with an appropriate subset of potential other entities. Moreover, promulgating that information to too many entities unnecessarily increases network traffic and would be avoidably computationally taxing. Conversely, promulgating the information to too few entities leaves certain entities without the information they need or are required to have, adversely affecting both the entities (because, e.g., they do not have the information that is needed or required to effectively serve users without wasted effort or missed opportunities) and the users (because, e.g., the users are unreachable or otherwise not having their rights and interests sufficiently safeguarded). Further, users often do not wish to provide all their information to one entity (or otherwise to too many entities) due to privacy and security concerns. For example, having all of one's data in one system exposes the user to the risk of having more data compromised in case that system is hacked or otherwise releases data or the system misuses the information, intentionally or otherwise. Furthermore, in some cases, a user may wish to have one or more entities delete certain data from their systems, or may otherwise wish to limit or restrict how certain data may be used or treated by certain entities, so as to implement, propagate, and/or enforce, for example, a "right to be forgotten" and/or various privacy or security policies or measures. In some situations, data may be restricted or marked for deletion while allowing for rollback or reversal of the restriction or deletion. Data may be encrypted, removed, or otherwise deactivated from one or more databases, devices, or systems, but the operation may be temporary, reversible, or limited to only certain databases, devices, or systems. For example, a "delete with rollback" process may be implemented, such that data is removed, deactivated, or encrypted (or otherwise rendered unavailable or unusable) for certain time periods or certain databases, devices, or systems, but replaced or decrypted (or otherwise rendered available or usable) after a certain time, during certain time periods, or for certain databases, devices, or systems. In some situations, data may be removed from all but a master server or central system, such that a user could repopulate one or more entity devices from that master server or central system without retransmitting the data.

Various embodiments employ a standardized set of bytes (which, as used herein, is a unit of digital information that is not necessarily eight bits but rather may have a smaller or larger number of bits), with each byte unique identifying specific data. Bytes may uniquely identify user data with a granularity specifically selected to suitably implement a system that efficiently manages and promulgates the user's different data. With respect to telephone numbers, for example, different bytes may correspond with different phone numbers. In a simplified example, one standardized set of bytes may include two bytes (e.g., 0001 and 0010) for two telephone numbers, with a first byte (e.g., 0001) linked to a personal phone number, and a second byte (e.g., 0010) linked to a business phone number.

In various embodiments, a standardized byte set may be defined to include a greater number of bytes for telephone numbers to achieve greater granularity. For example, in an example, several more bytes may be implemented, such as a first byte (e.g., 01100101) linked to a primary personal mobile number shared with family and friends, a second byte (e.g., 01100110) linked to a secondary mobile number shared with only certain other contacts, a third byte (e.g., 01100111) linked to a primary work mobile number for certain colleagues, a fourth byte (e.g., 01101000) linked to a secondary work mobile number for others, a fifth byte (e.g., 01101001) linked to a home land line, a sixth byte (e.g., 01101010) linked to a direct work line, a seventh byte (e.g., 01101011) linked to a work number for the front desk of the office, an eight byte (e.g., 01101100) linked to a personal fax number, a ninth byte (e.g., 01101101) linked to a work fax number, and so forth as deemed suitable. As another example, with respect to name, a first byte (e.g., 110010) may be linked to current first legal name, a second byte (e.g., 110011) may be linked to a first current legal middle name, a third byte may be linked to a current second legal middle name (e.g., 110100), a fourth byte may be linked to a current legal pre-hyphen last name (e.g., 110101), a fifth byte may be linked to a current legal post-hyphen last name (e.g., 110101), a sixth byte may be linked to a maiden name (e.g., 110110), a seventh byte may be linked to a prior (previously-used) name (e.g., 110111), an eight byte may be linked to a nickname (e.g., 111000), and so forth. Once a standard byte set with the desired granularity is selected, the bytes may be immutable, such that, for example, the byte corresponding to work fax number cannot be changed from its original value (e.g., cannot be changed from 01101101, in the above example standard byte set).

In various embodiments, bytes in a standard byte set may additionally be linked to various other data elements indicative of, for example, various states, timing, mutability, rights, usability for particular purposes, transferability or accessibility to other entities, instructions to delete associated values (e.g., delete values in a field from all or certain database so that values are no longer stored), expiration dates (after which a value is to be deleted or rendered unusable, generally or for specific purposes), reversibility (such that, for example, data is deleted or restricted temporarily for one or more databases, devices, or systems, and subsequently replaceable or releasable to roll back the deletion or restriction and thereby make the data usable again for the relevant databases, devices, or systems), etc. For example, each byte may be linked to state elements indicating whether a value of a unique data field has changed (e.g., 00 for no change, 01 for yes change), when the value was changed (e.g., a date such as YYYYMMDD, or a date and time such as YYYYMMDDHHMMSS), a time frame (e.g., 0001 for changed within the hour, 0010 for changed today, 0011 for changed within the last week, 0100 for changed within the last month, 0101 for changed within the last year, and 0110 for changed more than a year ago), mutability (e.g., 00 for immutable unique data fields, such as a byte linked to social security number, and 01 for mutable unique data fields, such as a byte linked to a user's home address), such that immutable unique data fields may require, for example, additional corroboration by other devices to confirm a mutation, usability (e.g., 0001 for permitting all uses of associated data by an entity device, 0002 for permitting only certain uses of associated data by an entity device, etc.), transferability (e.g., 0000 for no sharing with other entity devices, 0001 for sharing permitted with certain categories of entity devices, etc.), expiration (e.g., 0000 for no expiration, 0001 for data expires in a week, 0010 for data expires in a month, 0011 for data expires at the end of the calendar year, etc.), deletion (e.g., 0000 for no instruction to delete, 0001 for all entity devices delete associated data from all databases maintained or controlled by the entity devices, 0010 for a certain category of entity devices delete the data from all databases maintained by the entity devices in that category, 0011 for a certain category of entity devices delete the data from certain categories of databases, etc.), and reversibility (e.g., 0000 for permanent deletion or restriction of certain data without the ability to subsequently reverse, undo, or roll back the deletion or restriction, 0001 for deletion or restriction from all systems except for a central system such that the entity devices could be repopulated from the central system, 0010 for keeping certain data in encrypted form so as to deactivate the data until subsequently provided with a key that could be used to decrypt the data for subsequent use, etc.).

In various embodiments, a standardized byte set may be used by a decentralized network of entity devices. Devices may join such a network through, for example, subscription or certification, and adopt and employ the standards used by the others. The entity devices may then more reliably and computationally-efficiently query each other for state elements via bytes, rather than data characterizations, which require more computational resources (e.g., processing power for generation or acquisition of characterizations, memory for storage of the characterizations, networking capability to transfer the greater amount of data used by the characterizations, etc.), and which may be misinterpreted due to a lack of standardization.

Additionally or alternatively, in various embodiments, a centralized system may be used to maintain, for a set of users, state elements for each byte in the set. The centralized system may accept requests (e.g., API calls) from entity devices wishing to obtain (i.e., "pull") data on whether one or more specific bytes (e.g., all bytes or specifically-identified bytes) have state elements indicating certain changes to the information. Additionally or alternatively, the centralized system may transmit (i.e., "push") state changes to entity devices wishing to receive data on whether one or more specific bytes (e.g., all bytes or specifically-identified bytes) have mutated state elements indicating certain changes to the information. Such data pushes may be configured to occur based on specific conditions or rules, such as upon a state mutation, or periodically with a specified frequency (e.g., weekly). Pushes may be configured based on specific entities or categories of entities, such that, for example, a change of user data with certain businesses (e.g., an online retailer) does not result in a push to certain other entities (e.g., a doctor's office).

Each byte may correspond to a unique data field, but the central system may lack the unique data fields themselves. In this manner, if the central system's data is compromised, a fraudster may obtain information on whether and/or when certain user data has changed without obtaining any of the data itself. In various embodiments, for each user, activation elements may indicate whether entity devices may pull state data from the central system. For example, in a highly-granularized example, each byte of a user may be linked to separate pull activation elements for each entity device in the network of entity devices, and additionally may be linked to separate push activation elements for each entity device. Standardization of bytes enables each device in a network of entity devices to determine whether there has been a change in specific data that is relevant to the particular entity device. Subscribing entities are able to maintain updated information more efficiently, and users are able to maintain better control over which entities have which user data.

FIG. 1 depicts a block diagram of a system 100 enabling computationally-efficient data promulgation according to example embodiments. The system 100 includes a central system 110 (e.g., an independent data promulgation service provider), which may be implemented using one or more computing devices. The system 100 also includes one or more user devices 130, and multiple entity devices 150. The components of the system 100 may be communicably and operatively coupled to each other over a network that permits the direct or indirect exchange of data, values, instructions, messages, and the like (represented by the double-headed arrows in FIG. 1). In various embodiments, entity devices 150 may communicate with each other to obtain state elements, entity devices 150 may communicate with user devices 130 to obtain values for data fields, user devices 130 may communicate with central system 110 to manage rights, and central system 110 may communicate with entity devices 150 to provide and maintain a record of state element mutations.

Each device in system 100 may include one or more processors, memories, network interfaces, and user interfaces. The memory may store programming logic that, when executed by the processor, controls the operation of the corresponding computing device. The memory may also store data in databases. The network interfaces allow the computing devices to communicate wirelessly or otherwise. The various components of devices in system 100 may be implemented via hardware (e.g., circuitry), software (e.g., executable code), or any combination thereof.

Central system 110 may also include an application programming interface (API) gateway 112 to allow other systems and devices to interact with central system 110 via various APIs, such as APIs that facilitate authentication, data retrieval, etc. The central system 110 may provide various functionality to other devices through APIs. Generally, an API is a software-to-software interface that allows a first computing system of a first entity to utilize a defined set of resources of a second (external) computing system of a second (third-party) entity to, for example, access certain data and/or perform various functions. In such an arrangement, the information and functionality available to the first computing system is defined, limited, or otherwise restricted by the second computing system. To utilize an API of the second computing system, the first computing system may make an API call to the second computing system. The API call may be accompanied by a security or access token or other data to authenticate the first computing system and/or a particular user. The API call may also be accompanied by certain data/inputs to facilitate the utilization or implementation of the resources of the second computing system, such as data identifying users, accounts, dates, functionalities, tasks, etc. In system 100, central system 110 may accept or receive API calls via API gateway 112.

In various implementations, requests/transmissions from entity devices 150 to central system 110 may be in the form of API calls from the entity device 150 (generated, e.g., via API engine 154) and received by the central system 110 (via, e.g., API gateway 112). Such API calls may include or be accompanied by various data, such as standardized bytes and data identifying one or more entities, entity devices, users, and/or user devices. Central system 110 may moreover include a security client 114 which may provide fraud prevention measures and security protections (such as generation of security tokens, authentication of devices, verification of biometric or other security data, etc.). The central system 110 may also include a rights manager 116, which enables users to effect data promulgation through changes to entity rights and permissions that can be submitted via, for example, user selections made using graphical user interfaces. Central system 110 includes database 120 with bytes linked to unique data fields (values for which may be stored in database 156 but not in database 120), state elements, and activation elements corresponding to various user devices 130 and entity devices 150.

User devices 130 may also include one or more user interfaces 132, which may include one or more biometric sensors/ambient sensors 134. User interfaces 132 may include components that provide perceptible outputs (e.g., displays and light sources for visually-perceptible elements, a speaker for audible elements, and haptics for perceptible signaling via touch), that capture ambient sights and sounds (such as cameras and microphones), and that allow the user to provide inputs (e.g., a touchscreen, stylus, force sensor for sensing pressure on a display screen, and biometric components such as a fingerprint reader, a heart monitor that detects cardiovascular signals, an iris scanner, and so forth). One or more user devices 130 may include one or more location sensors 136 to enable the user device 130 to determine its location relative to, for example, other physical objects or relative to geographic locations. Example location sensors 136 include global positioning system (GPS) devices and other navigation and geolocation devices, digital compasses, gyroscopes and other orientation sensors, as well as proximity sensors or other sensors that allow the user device 130 to detect the presence and relative distance of nearby objects and devices. The user devices 130 may include applications 138, such as a client application provided or authorized by the entity implementing or administering the central system 110 as well as client applications obtained and/or accessed via entity devices 150. Example data promulgation service providers may include trusted entities such as banks or other financial institutions, which are highly incentivized to inspire trust, prevent fraud, and maintain verified user data useful for authentication and for maintaining security.

Each entity device 150 may also include a security client 152 which may provide fraud prevention measures and security protections (such as generation of security tokens, authentication of devices, verification of biometric or other security data, etc.). Entity device 150 may also include API engine 154, which may utilize APIs to communicate with other devices and systems and provide various functionality. For example, API engine 154 may generate API calls to central system 110, which may accept the API calls via API gateway 112. Entity device 150 may include a user database 156 to maintain data (e.g., unique data fields) of users with which the entity device 150 interacts and transacts.

Figure 2A:
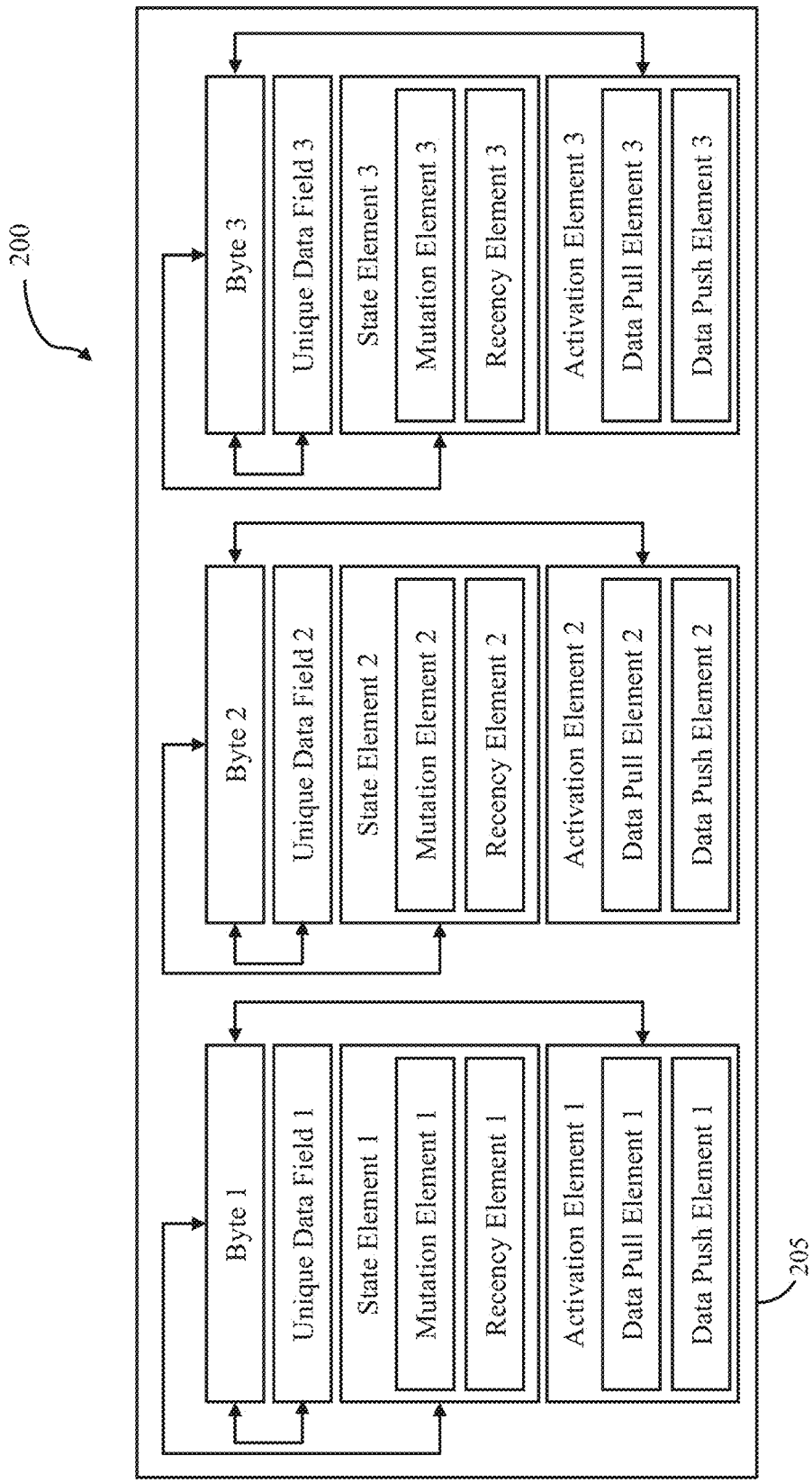
FIG. 2A is a representation of an example database structure, according to various potential embodiments.

FIG. 2A represents a potential data structure 200 with an example database 205 according to various potential embodiments. Database 205 may be, for example, part of databases 156 of entity devices 150. In database 205, a set of standardized bytes (byte 1, byte 2, byte 3) corresponding to a particular user are represented, each linked to a corresponding unique data field, state element, and activation element. In some embodiments, each state element may include a mutation element indicating whether a mutation has occurred, and a corresponding recency element indicating how recently the mutation occurred. In certain embodiments, each activation element may comprise data pull elements indicating whether state data may be pulled by other entity devices 150, and/or data push elements indicating whether (and with what frequency) state data may be pushed to other entity devices 150. In one simplified example, byte 1 may be "0001" corresponding to legal first name, unique data field 1 may be "John," state element 1 may be "00" for "not mutated," and activation element 1 may be "1111" for enable promulgation of state data (i.e., state elements, mutation elements, and/or recency elements) with all or certain entity devices 150, while byte 2 may be "0010" corresponding to legal last name, unique data field 2 may be "Smith," state element 2 may be "01" for "yes mutated" (due to, e.g., a name change due to marriage) or "0101" for "mutated within the last month," and activation element 2 may be "0000" for "disable data pulls" by all or certain entity devices. Continuing with this simplified example, if mutation, recency, data pull, and/or data push elements are included, mutation element 1 may be "00" for "no mutation" in unique data field 1, recency element 1 may be "0000" for "Not Applicable," data pull element 1 may be "0011" for enable data pulls by all or certain entity devices 150 with respect to state element 1, data push element 1 may be "0000" for disable data pushes with respect to state element 1, mutation element 2 may be "01" for "yes mutation" in unique data field 2, recency element 2 may be "0010" for "within prior month," data pull element 2 may be "0011" for enable data pulls by all or certain entity devices 150 with respect to state element 2, and data push element 2 may be "0000" for disable data pushes with respect to state element 2. In various alternative embodiments, other elements may be included to provide greater control and/or to enrich the data. For example, bytes may be linked to data elements indicating source (e.g., entity device 150) of promulgated data that triggered particular state element mutations.

Figure 2B:
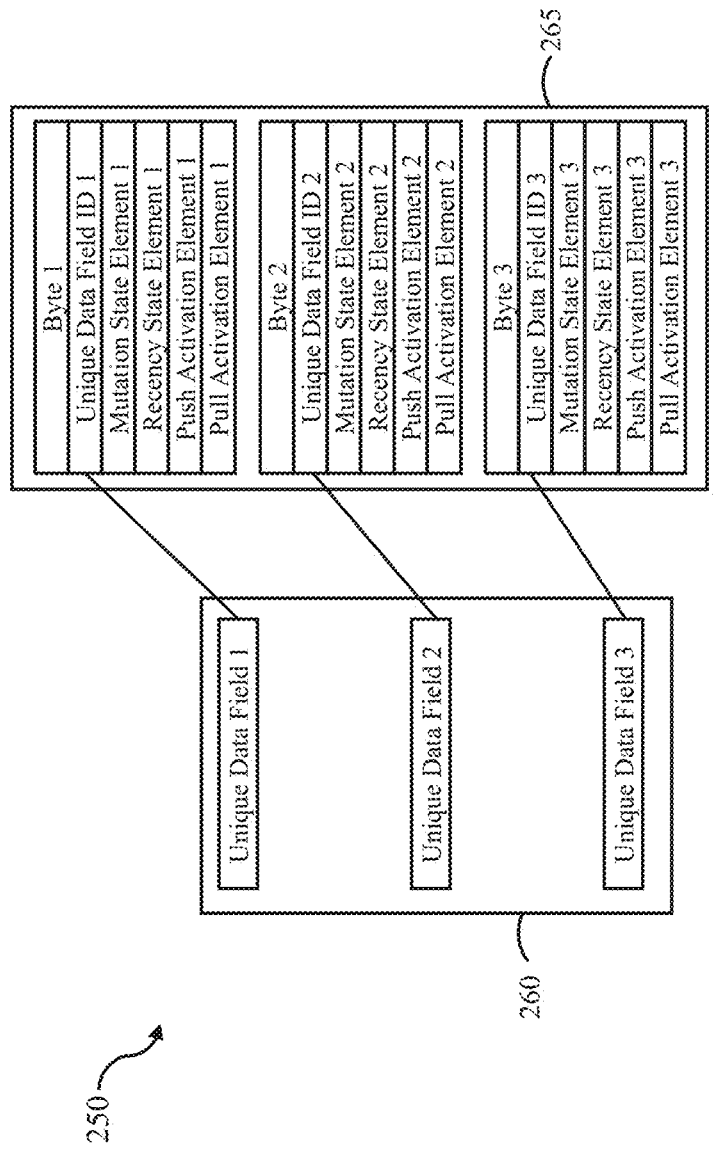
FIG. 2B is a representation of another example database structure, according to various potential embodiments.

FIG. 2B represents a potential data structure 200 with example databases 260 and 265 according to various potential embodiments. Database 260 may be, for example, part of databases 156 of entity devices 150, and database 265 may be, for example, part of database 120 of central system 110. Database 265 may include the unique data fields with values corresponding to user data, such as unique data fields 1, 2, and 3 corresponding to "John," "Albert," and "Smith," respectively. Database 265 may comprise the standard byte set, with each byte linked with a unique data field identifier that uniquely identifies corresponding unique data fields in database 260. Each byte in database 265 may also be linked to state elements (e.g., mutation and recency state elements) and activation elements (e.g., push and pull activation elements).

Figure 3:
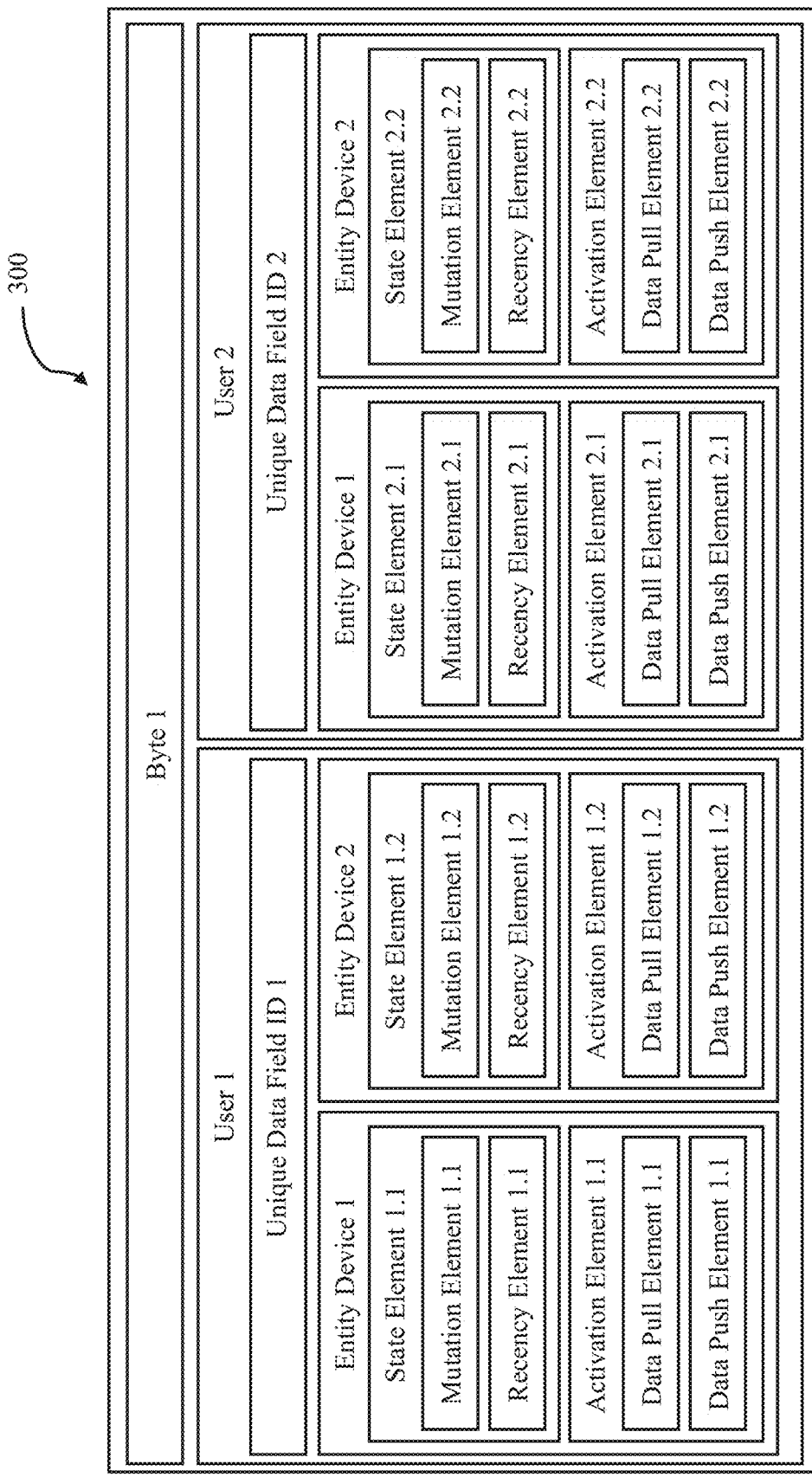
FIG. 3 is a representation of yet another example database structure, according to various potential embodiments.

FIG. 3 represents a potential data structure 300 with example database 305 according to various potential embodiments. Database 305 may be, for example, part of database 120 of central system 110. Database 305 comprises, for each byte in a standard set of bytes (only byte 1 of a set of N bytes is shown as an example), a set of users (user 1, user 2, etc.) for which user data is maintained. For each user, a unique data field corresponding to the byte is identified via a unique data field identifier (ID). In some embodiments, database 305 may itself include the unique data fields, in which case database 305 may alternatively or additionally include values for unique data fields. For each user, state elements and activation elements are provided on a per-entity-device basis, as state elements and/or activation elements may differ for each entity device 150 in a network. For example, entity device 1 in the network may have a value for unique data field 1 that has mutated recently, whereas entity device 2 in the network may not have a value for unique data field 1 that has mutated recently (e.g., because user data was received by entity device 1 but not promulgated to entity device 2). Entity device 1 may have certain data push and/or pull rights with respect to byte 1 that differ from data push and/or pull rights of entity device 2 with respect to byte 1.

Figure 4:
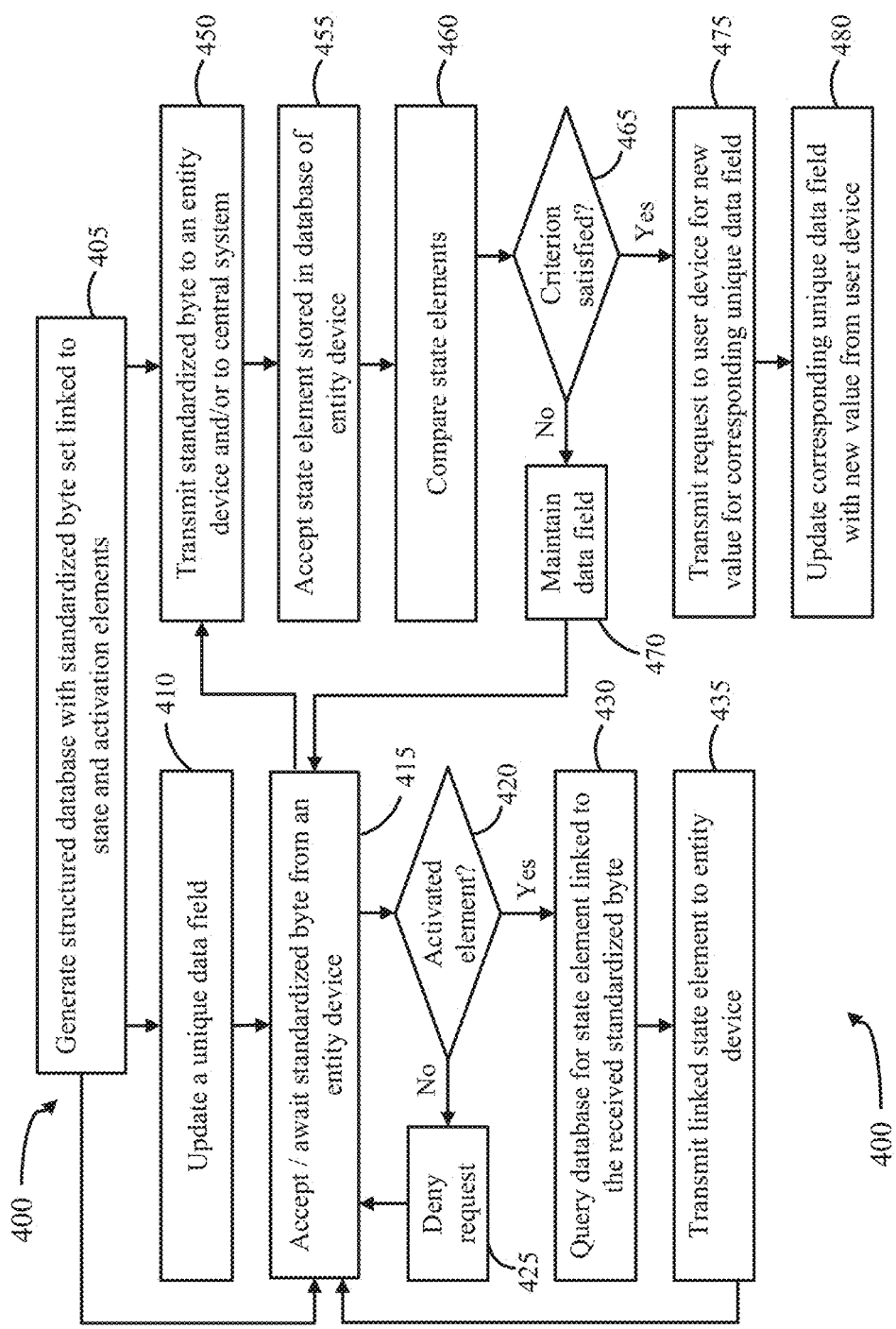
FIG. 4 is a flow diagram of an example process for promulgating data among devices in a network, according to various potential embodiments.

FIG. 4 is a flow diagram of a method 400 for implementing data promulgation according to various potential embodiments. At 405, one or more structured databases with a standardized set of bytes may be generated. The structured databases may be generated by entity devices 150 and/or central system 110. The bytes are immutable, so that their use stays consistent and reliable in data promulgation, unless and until a new standardized byte set is generated and adopted by the entity devices 150 in the network. Each byte may correspond to a unique data field that is stored in the same or in another database. Each byte may also be linked to state and activation elements. The structured database is configured such that a mutation in value of a unique data field automatically triggers a mutation in a corresponding state element linked to a corresponding byte. At 410, a value for a unique data field may be updated. For example, an entity device 150 may receive a new value for last name from a user device 130. The change in value triggers a mutation in the corresponding state element. Method 400 may proceed to step 415 following step 410, or may proceed to step 415 directly from step 405. In some embodiments, method 400 may begin at step 415.

At 415, a central system 110 and/or a first entity device 150 receives a standardized byte (linked to a unique data field) from a second entity device 150. This byte may be received as an API call or other state element request corresponding to the byte. At 420, the central system 110 and/or first entity device 150 may determine whether data pulls are activated for the second entity device 150 (based on, e.g., a data pull element corresponding to the second entity for the particular byte of the particular user). At 425, if data pulls are not activated for the second entity device 150, the central system 110 and/or first entity device 150 denies the API call (or other state element request). At 430, if data pulls are activated for the second entity device 150, the central system 110 and/or first entity device 150 may query one or more structured databases (e.g., database 120 and/or database 156) for the state element linked to the byte received in the state element request. Method 400 may then proceed to 415 to await another state element request from a third entity device 150.

In various embodiments, method 400 may proceed to step 450 after step 405. In some embodiments, method 400 may proceed to step 450 once the standardized byte is received at step 415. In certain embodiments, method 400 may begin at step 450. At 450, the standardized byte, which may have been received from a first entity device 150, may additionally or alternatively be transmitted to a fourth entity device 150 and/or to central system 110. In certain embodiments, this enables "indirect" data promulgation from an entity device 150 that receives a state element from another entity device 150 in a network, allowing certain devices 150 to potentially serve as a gatekeeper to requests from certain other devices 150. In some embodiments, this enables corroboration or confirmation of state element mutations. At 455, the central system 110 and/or first entity device 150 accepts, from the fourth entity device 150, a state element corresponding to the byte that was transmitted to the fourth entity device 150. At 460, central system 110 and/or first entity device 140 may compare the state element from the fourth entity device 150 with another state element (also corresponding to the same byte) that is stored by (or otherwise available to) the central system 110 and/or the first entity device 150.

At 465, the central system 110 and/or first entity device 150 determines whether, based on the comparison at 460, a mutation criterion is satisfied. A mutation criterion may be, for example, whether the fourth entity device 150 has a more-recently updated value for the corresponding unique data field based on a comparison of state elements (e.g., comparison of recency elements). If the criterion is not satisfied (e.g., if the fourth entity device 150 does not have a more-recently updated unique data field value corresponding to the linked standardized byte), at 470, the value for the unique data field is left unchanged, and method 400 may proceed to step 415. If at 465 the criterion is satisfied, at 475, the central system 110 and/or first entity device 150 may transmit a request to a user device 130. The request may be intended to inquire about and/or receive a new value for a particular data field. For example, following a determination that a user's data has changed (based on a state element comparison), the first entity device 150 may transmit a message to the user device 130 to request the new data.

In some embodiments, a central system 150 which does not itself maintain values for unique data fields may transmit a message to the user device 130 to indicate that a state element mutation has been detected with respect to a certain entity device 150 of an entity, and to propose the user also share the new value with one or more other entity devices 150 of other entities. In some embodiments, the central system 150 may transmit a message to the user device 130 to present one or more options and inquire as to how the user would like to proceed. For example, the central system 110 may transmit to the user device 130 an option to have the central system 110 notify one or more entity devices 150 that there has been a state element mutation so that the other entity devices 150 may communicate with the user device to inquire as to whether the user would like to provide the new value to any of the entity devices 150. Additionally or alternatively, the central system 110 may transmit to the user device 130 an option to authorize the entity device 150 with updated date to promulgate that data to one or more other entity devices 150. In response to such authorization, central system 110 may instruct the entity device 150 with the updated data to promulgate the data to other identified entity devices 150. If the user device provides the requested user data to the first entity device 150, the first entity device 150 may update the unique data field in its database.

Figure 5:
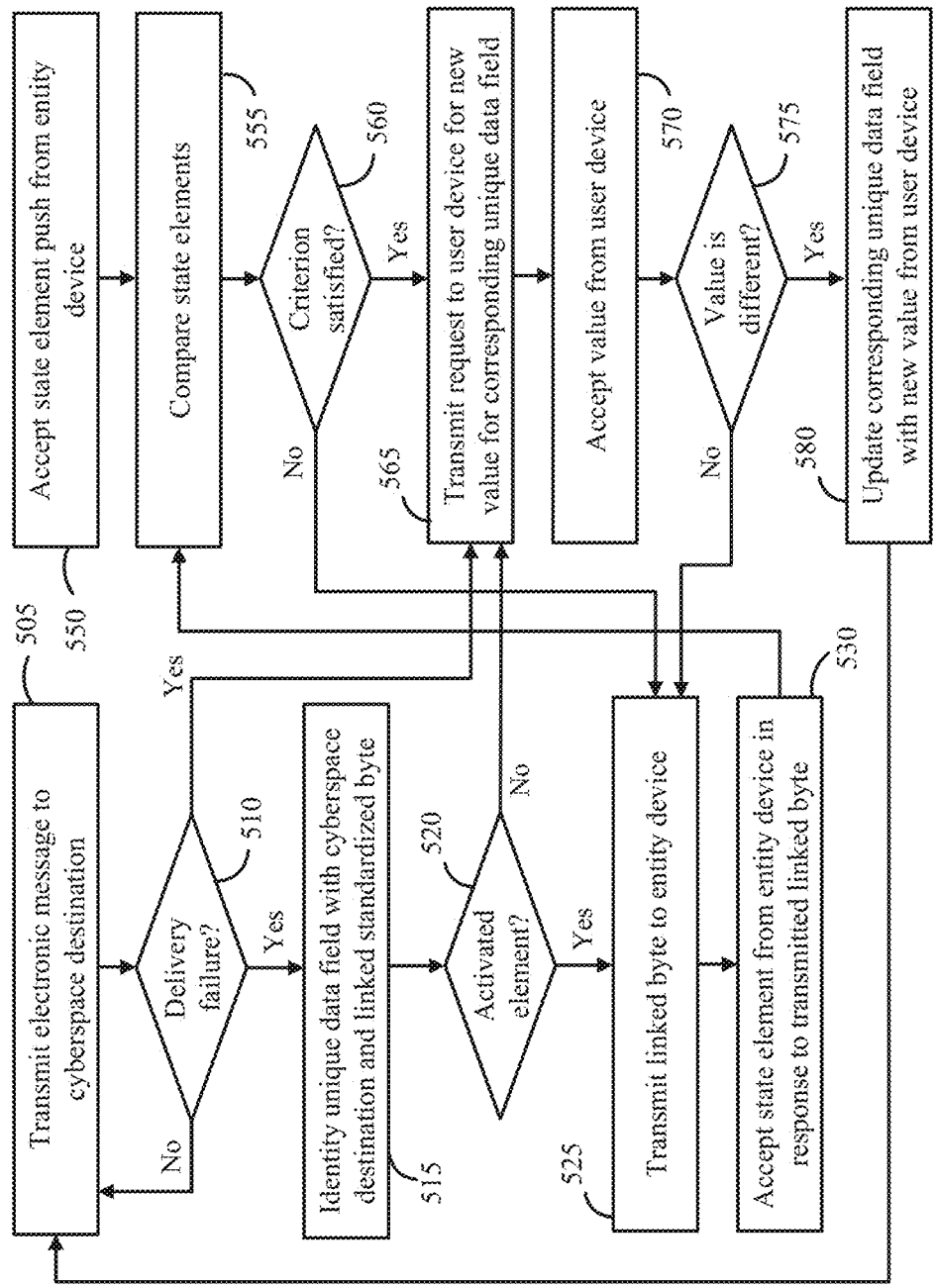
FIG. 5 is a flow diagram of an example process for promulgating data among devices in a network, according to various potential embodiments.

FIG. 5 is a flow diagram of a method 500 for implementing data promulgation according to various potential embodiments. At 505, a first entity device 150 transmits an electronic message to a cyberspace destination, such as an email address or mobile phone number. At 510, the first entity device 150 determines whether delivery of the electronic message failed to the cyberspace destination. This may be determined through, for example, a "bounced" message, lack of a delivery confirmation within a certain time (e.g., one hour or one day), or other indication that there was an "error" with respect to the transmission. If there is no delivery failure, method 500 may return to step 505.

If at 510 there is a delivery failure, the first entity device 150 may determine which unique data field comprises the cyberspace destination, and identify the immutable byte linked to the unique data field. At 520, the first entity device 150 determines whether the byte is linked to activation element that enables data pulls from a second entity device 150. At 525, the first entity device 150 transmits the linked byte to the second entity device 150 (as part of, e.g., an API call to the second entity device 150). At 530, the state element may be accepted from the second entity device 150 in response to the transmitted linked byte. At 555, the state element from the second entity device 150 is compared with a state element already available to the first entity device 150. In various embodiments, method 500 begins at step 550, at which the first entity device 150 accepts a state element pushed to it from the second entity device 150 (e.g., as part of a periodic data push arranged between the first and second entity devices 150), and at 555, the pushed state element is compared to the state element already available to the first entity device 150.

At 560, if a criterion is satisfied (e.g., if the state element received from the second entity device 150 indicates that the unique data field has been updated in the database 156 of the second entity device 150 more recently than it has been updated in the database 156 of the first entity device 150), then at 565, the first entity device 150 may transmit a request to a user device 130 to request a new value for the unique data field (e.g., a new email address or mobile phone number). At 570, the first entity device 150 accepts a value for the unique data field from user device 130. At 575, the first entity device 150 compares the value from the user device 130 (e.g., a new value for the unique data field transmitted to the first entity device 150 by the user device 130) with the previously-available value (e.g., the cyberspace destination that experienced the delivery failure or other error). If the received value is different, then at 580 the first entity device 150 updates the corresponding unique data field in its database 156 to replace the old value with the new value. This change triggers a mutation in the corresponding state element. Alternatively or additionally, if the first entity device 150 determines at 575 that the value is different, the first entity device 150 may push the mutated state element (without transmitting the new value) to one or more other entity devices 150 and/or to central system 110 (not shown). If the value is not different at 575, then the method 500 may end (not shown). Alternatively, the method 500 may proceed to step 525 to transmit the corresponding byte to another entity device 150 to determine whether the other entity device 150 has received a more recent update.

In various embodiments, if there is a delivery failure at 510, and/or if data pulls are not activated for another entity device 150 deemed to receive suitably reliable or useful information at 520, method 500 may proceed to step 565, at which the first entity device 150 may attempt to request an update from the user device 130. In some embodiments, if the criterion is not satisfied at 560, method 500 may proceed to step 525 to transmit the byte to another entity device 150 to determine whether another entity device 150 has a different state element (indicating, e.g., that the other entity device 150 has more recently updated the unique data field). In various embodiments, method 500 may begin at step 515, before a delivery failure is detected. This allows one entity device to determine whether user data (e.g., an email address, phone number, or a home address) has been updated before an action is taken (e.g., before an email, phone call, or costly printed mailing is attempted).

Figure 6:
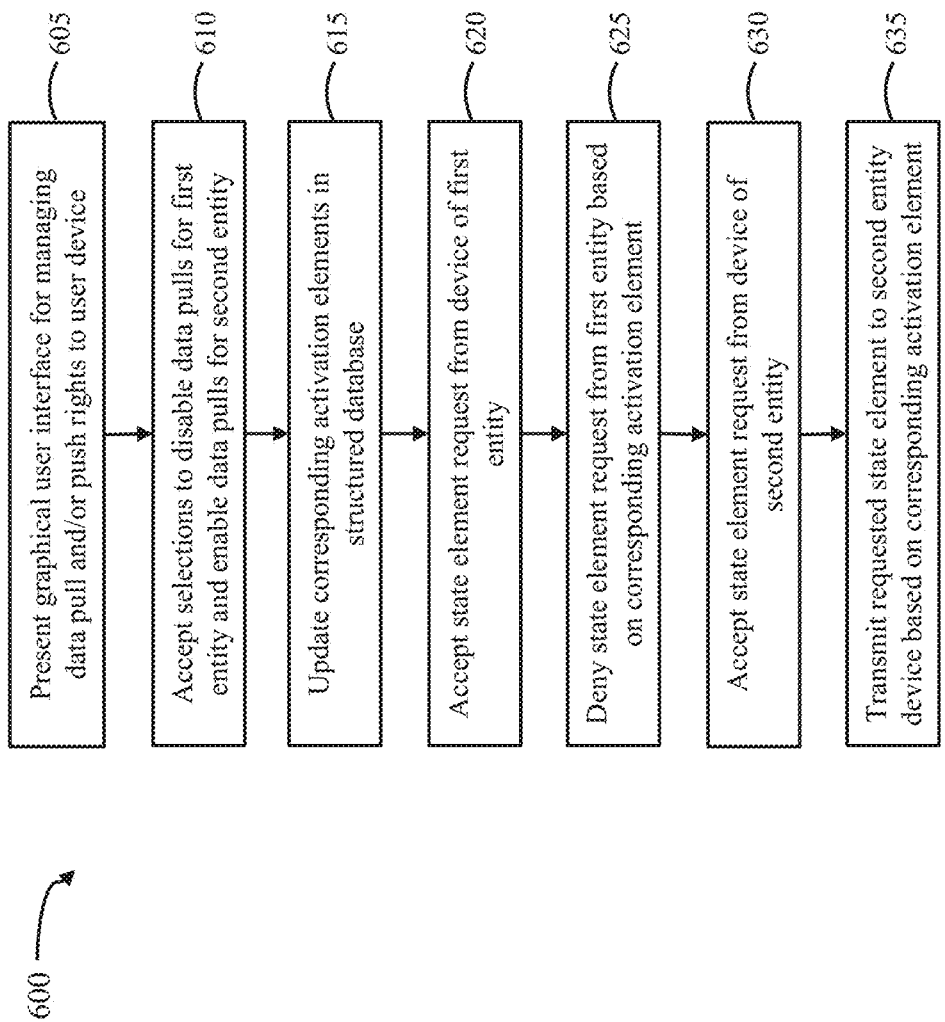
FIG. 6 is a representation of an example set of functions performable by a central system capable of managing states and data pull and push rights, according to various potential embodiments.

FIG. 6 is a flow diagram of a method 600 for implementing data promulgation according to various potential embodiments. Method 600 may be implemented via the central system 110, one or more entity devices 150, and/or one or more user devices 130. At 605, a graphical user interface (GUI) is presented to a user device 130 to allow the user to manage data pull and/or data pull rights with respect to particular data fields and/or particular entity devices 150 of specific entities. At 610, selections made via the GUI are accepted, such as a selection to disable or deactivate data pull rights for a first entity device 150 and to enable or activate data pull rights for a second entity device 150. At 615, activation elements are updated in a structured database, such as updating a pull activation element corresponding to the first entity device 150 to a disabled or deactivated ("off") status, and/or updating a pull activation element corresponding to the second entity device 150 to an enabled or activated ("on") status. At 620, the central system 110 or entity device 150 may accept a first state element request (e.g., a first API call) from a first entity device 150 of the first entity. At 625, the central system 110 or entity device 150 may deny the first state element request from the first entity device 150 based on the updated (disabled) activation element. At 630, the central system 110 or entity device 150 may accept a second state element request (e.g., a second API call) from a second entity device 150 of the second entity. At 635, the central system 110 or entity device 150 may transmit the requested state element to the second entity device 150 (i.e., approve the request) based on the updated (enabled) activation element.

In various embodiments, entity devices may receive, from other entity devices and/or from a central system, a state element indicating that values in data fields associated with identified bytes are, for example, to be deleted from certain or all databases that are maintained (or controlled) by the entity devices, rendered unusable for certain purposes, made un-sharable with other entity devices, or made to expire after a certain time or at a specified point in time. In response, an entity device may delete certain data or otherwise change how the entity device uses, treats, or maintains corresponding data fields or values therein. In various embodiments, entity devices may receive, from other entity devices and/or from a central system, a state element indicating that certain data is to be reversibly restricted or deleted so as to allow rollback, such as by being kept in encrypted form or deleted from only certain devices or systems and not from others (such as a central system), such that the deleted data can be repopulated from the devices or systems from which the data was not deleted. Encryption/decryption keys may be previously made available, or may accompany a "delete with rollback" state element. In response, an entity device may delete, encrypt, or otherwise inactivate or render unusable for certain time periods (e.g., for the remainder of the calendar year or only during certain time windows or seasons), and may wait for an instruction to reverse, or may implement automated reversal at the suitable time. In some embodiments, certain data may be rendered unusable because, for example, certain data (e.g., a certain address or telephone number of a user) is only valid or used during certain times of the year or may otherwise be temporarily not used.

Figures 7, 8:
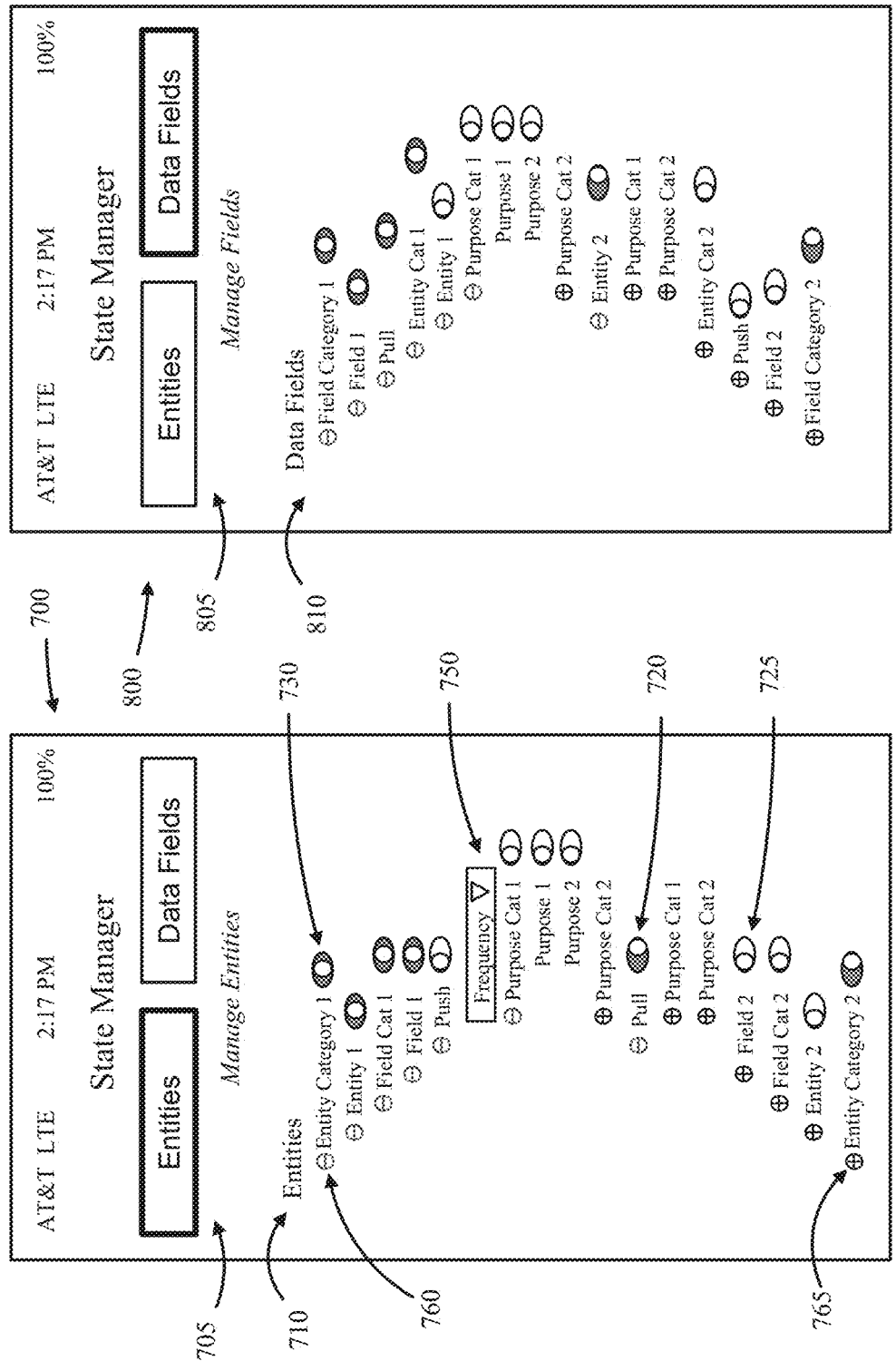
FIG. 7 is an example user interface for managing and controlling data promulgation by entity, according to various potential embodiments.
FIG. 8 is an example user interface for managing and controlling data promulgation by data fields, according to various potential embodiments.

Referring to FIG. 7, an example user interface 700 for an example application or website (e.g., client application 138 titled "State Manager") is provided, according to various potential embodiments. The user interface 700 is shown as a display on a user interface 132 of a user device 130. The user interface 700 includes various toggles 705 ("Entities" and "Data Fields"). As shown by the bolded outline, "Entities" is selected in FIG. 7. Accordingly, the user interface 700 is an entities-level user interface. While in the entities-level user interface 700, the user can view, select (by, e.g., tapping an entry), and/or modify (e.g., by touching and holding an entry, or touching the entry with relatively greater force) data pull rights and/or manage data pushes for various entities 710.

Entities may be grouped together into pre-defined or user-defined categories (e.g., healthcare clinics, online merchants, sub-contractors, family, friends, etc.), as can fields (e.g., personal data, financial data, employment data, etc.), and purposes (e.g., fraud notification, promotions and marketing, etc.). User interface 700 provides general toggle switches 720, 725, 730 to allow the user to authorize (activate, enable, turn on, etc.) or de-authorize (deactivate, disable, turn off, etc.) data pulls and data pushes by entity category, specific entity, data field category, specific data field, purpose category, specific purpose, etc. For example, in FIG. 7, toggle 720 (to the right) indicates all data pulls for all purposes are enabled for Data Field 1 (in Data Field Category 1) for Entity 1 (in Entity Category 1). Similarly, toggle 725 (to the left) indicates that no data pulls or pushes are enabled for any purpose with respect to Data Field 2 for Entity 1. Toggle 730 (in the middle) indicates that at least one selection is enabled and at least one selection is disabled for Entity Category 1. In interface 700, for data pushes, a frequency selector 750 allows the user to select (as shown, via a pull-down menu) how often a state element is to be pushed (e.g., hourly, daily, weekly, monthly, quarterly, semi-annually, or annually). Selector 760 allows the user to "collapse" (i.e., show fewer) sub-categories, and selector 765 allows the user to "expand" (i.e., show more) sub-categories.

Referring to FIG. 8, an example user interface 800 for an example application or website (e.g., client application 138 titled "State Manager") is provided, according to various potential embodiments. The user interface 800 is shown as a display on a user interface 132 of a user device 130. The user interface 800 includes various toggles 805 ("Entities" and "Data Fields"). As shown by the bolded outline, "Data Fields" is selected in FIG. 8. Accordingly, the user interface 800 is a fields-level user interface. While in the fields-level user interface 800, the user can view, select (by, e.g., tapping an entry), and/or modify (e.g., by touching and holding and entry, or touching the entry with relatively greater force) data pull rights and/or manage data pushes for various fields 810. As an example, in user interface 800, data pulls are enabled for Entity 2 (which is in Entity Category 1) for all purposes with respect to Data Field 1 (which is in Field Category 1).

Various embodiments of the disclosure relate to a method implemented by a first device of a first entity. The method may comprise generating a first structured database comprising a standardized set of bytes. Each byte may be linked to a unique data field and to one or more state elements. Each byte may also be linked to one or more activation elements. The bytes may be immutable while the state elements may be mutable, as may the activation elements. The database may be configured such that a mutation to a unique data field automatically triggers a mutation to a corresponding state element. The method may comprise overwriting a first unique data field with user data received from a remote user device of a user, thereby triggering a first mutation to a first state element corresponding to the first unique data field linked to a first byte.

The method may comprise accepting, from a second device of a second entity, a first API call. The second device may maintain its own structured database, which may comprise the standardized set of bytes employed by the first device. The first API call may be a first state-element request, which may be made in another manner other than the first API call. The first API call may transmitted to the first device by the second device via internet communications. The first API call may comprise the first byte from the set of bytes. The first API call may exclude a value for a corresponding unique data field stored in a second structured database maintained by the second device. The method may comprise querying the first structured database to determine, for the first byte, that a first activation element corresponding to the first byte enables state data pulls from the second device of the second entity. The first structured database may also be queried to retrieve the first state element linked to the first byte, which was identified in the first API call. The method may comprise transmitting, to the second device in response to the first API call, the first state element. The first state element may be transmitted via internet communications. The first state element may be transmitted without transmitting the first unique data field linked to the first byte in the first structured database.

In various embodiments, the method may comprise generating a second API call comprising a second byte in the set of bytes. The second API call may be a second state-element request, which may be made in another manner other than the second API call. The second API call may be transmitted to a third device of a third entity. The third device may maintain its own structured database, which may comprise the standardized set of bytes employed by the first and second devices. The second API may exclude a value for a second unique data field linked to the second byte. The method may comprise accepting, from the third device in response to the second API call, a second state element stored in a third structured database maintained by the third device. The second state element may have been transmitted to the first device by the third device via internet communications.

In various embodiments, the method may comprise comparing the second state element from the third structured database with a third state element corresponding to the second byte in the first structured database. The method may comprise, based on the comparison, transmitting a request for a new value corresponding to the second unique data field. For example, the comparison may indicate that the third device recently updated the value of the corresponding unique data field. The request may be transmitted to the remote user device. The request may be transmitted via internet communications. The method may comprise accepting the new value corresponding to the second unique data field. The new value may be received from the remote user device, which may have transmitted the new value to the first device via internet communications. The method may comprise overwriting the second unique data field with the new value, which may have been received from the user device, thereby triggering a second mutation to a third state element corresponding to the second unique data field linked to the second byte.

In various embodiments, each state element may comprise a recency element corresponding to mutation timing for each corresponding unique data field. Comparing the second state element with a third state element may comprise determining whether a mutation timing criterion is satisfied. Comparing the second state element with a third state element may comprise comparing a first recency element of the second state element with a second recency element of the third state element. The request may be transmitted (to the user device, for example) only if the comparing indicates a more recent mutation in the second structured database than in the first structured database for the second unique data field.

In various embodiments, each immutable byte may comprise a unique identifier for its corresponding unique data field. Each state element may comprise a first data element indicating whether its corresponding unique data field has mutated. Each state element may, alternatively or additionally, comprise a second data element indicating a recency of the mutation. The second data element may be or comprise, for example, a mutation date, a time elapsed since the mutation, and/or a date range.

In various embodiments, each activation element may indicate whether data pull calls are enabled for one or more entity devices. Each activation element may, additionally or alternatively, indicate whether data pushes are enabled for one or more entity devices. For each entity device for which data pushes are enabled, the corresponding activation element may further indicate a frequency of data pushes to the entity device. The method may comprise presenting a graphical user interface. The graphical user interface, which may be presented by the central system, may be viewed using the user device. The method may comprise accepting selections to change data pull rights. The method may comprise updating corresponding activation elements according to the selections.

In another aspect, various embodiments of the disclosure relate to a method implemented by a first device of a first entity. The method may comprise, if not already generated, generating a first structured database. The first structured database may comprise a standardized set of immutable bytes. Generating the first structured database may comprise linking each immutable byte to a unique data field, to a mutable activation element, and/or to a mutable state element. The first structured database, and/or the mutable state element therein, may be configured such that a unique data field mutation automatically triggers a corresponding state element mutation. The method may comprise transmitting an electronic message to a first cyberspace destination of a user. The method may comprise determining that the electronic message encountered a delivery error. The method may comprise identifying a first unique data field that comprises the cyberspace destination and that is linked to a first byte in the first structured database. The method may comprise determining that the first byte is linked to an activation element. The activation element may indicate whether data pulls from a second device of a second entity are enabled. The method may comprise transmitting, to the second device, a first API call that comprises the first byte if data pulls are enabled. The first API call may not comprise (i.e., may exclude) the first unique data field. The method may comprise accepting, from the second device in response to the API call, a second-device state element. The second-device state element may be stored in and retrieved from a second structured database maintained by the second device. The second-device state element may be linked to the first byte in the second structured database. The method may comprise determining that the second-device state element satisfies a mutation criterion for the second byte. The mutation criterion may require, for example, a mutation to be sufficiently recent (e.g., not more than a threshold length of time, such as a month or year, and/or within a date range). The method may comprise requesting from the user device, in response to determining the mutation criterion is satisfied, data corresponding to the first unique data field. The method may comprise accepting user data from the user device. The method may comprise determining that the user data comprises a second cyberspace destination different from the first cyberspace destination. The method may comprise overwriting the first unique data field with the user data from the user device and triggering a mutation in the first state element linked to the first byte in the structured database. The method may comprise transmitting, to the second cyberspace destination, a second electronic message indicating the first unique data field has been updated.

In various embodiments, the mutation criterion is a more recent mutation than in the structured database. The mutation criterion may be mutation within a specific time period. The method may comprise presenting a graphical user interface. The method may comprise accepting selections to change data pull rights via the graphical user interface. The method may comprise updating corresponding activation elements according to the selections.

In another aspect, various embodiments of the disclosure relate to a computing system. The computing system may comprise a structured database. The structured database may comprise, for each user in a set of users, a standardized set of immutable bytes. Each immutable byte in the standardized set may be linked to a unique data field of a user, to a mutable activation element, and/or to a mutable state element. The structured database may be configured such that a unique data field mutation automatically triggers a corresponding state element mutation. The computing system may comprise a processor and a memory comprising instructions executable by the processor and configured to cause the computing system to perform specific functions. If not previously generated, the functions may comprise generating the structured database.

In various embodiments, the functions may comprise presenting a graphical user interface to a remote user device of a user to enable the user to select, via the graphical user interface, which entities in a set of entities are granted data pull rights and/or data push rights. The functions may comprise, for example, accepting, via the graphical user interface, a first selection to disable data pulls for a first entity and/or a second selection to enable data pulls for a second entity. The functions may comprise updating the structured database such that one or more activation elements corresponding to the first entity are disabled and/or such that one or more activation elements corresponding to the second entity are enabled. The functions may comprise accepting, from a first device of the first entity, a first API call comprising a first byte. The first API call may be a first state-element request. The first API call may exclude the first byte's corresponding unique data field. The functions may comprise querying the structured database to determine that, for the first entity, the first byte is linked with a first activation element that does not enable (e.g., disables or turns off) data pulls from the first device. The functions may comprise transmitting, to the first device in response to the API call, a denial of the state-element request.

In various embodiments, the functions may comprise accepting, from a second device of the second entity, a second API call comprising a second byte. The second API call may be a second state-element request. The second API call may exclude the second byte's corresponding unique data field. The functions may comprise querying the structured database to determine that, for the second entity, the second byte is linked with a second activation element that enables data pulls from the second device. The functions may comprise transmitting, to the second device in response to the API call, a second state element corresponding to the second byte.

In various embodiments, the functions may comprise accepting, from a third device of a third entity, a state element data push comprising a third byte and a third state element corresponding to the third byte. The functions may comprise comparing the third state element from the third device with the third byte's state element in the structured database. The functions may comprise transmitting, to a user device, a request for a new value for the third byte's corresponding unique data field. The request may be transmitted based on whether the comparison indicates a criterion is satisfied. The functions may comprise accepting, from the user device, the new value corresponding to the third byte's corresponding unique data field. The functions may comprise overwriting the third byte's corresponding unique data field with the new value received from the user device thereby triggering a mutation to the third byte's linked state element in the structured database.

In various embodiments, each mutated state element in the structured database may indicate when the mutated state element's corresponding unique data field last mutated.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method implemented by a first device of a first entity, comprising:
    updating data in a first structured database comprising a standardized set of immutable bytes, wherein each immutable byte is linked to a unique data field and to a mutable state element, and wherein the first structured database is configured such that a mutation to a unique data field automatically triggers a mutation to a corresponding state element such that overwriting a first unique data field with user data triggers a first mutation to a first state element corresponding to the first unique data field linked to a first byte;
    receiving, from a second device of a second entity via internet communications, a first API call comprising the first byte in the set of immutable bytes, wherein the first API call does not include a value for a corresponding unique data field stored in a second structured database maintained by the second device;

retrieving, from the first structured database, the first state element linked to the first byte included in the first API call;

transmitting via internet communications, to the second device in response to the first API call, the first state element without transmitting the first unique data field linked to the first byte in the first structured database;

generating a second API call comprising a second byte in the set of immutable bytes and transmitting the second API call to a third device of a third entity, wherein the second API call does not include a value for a corresponding second unique data field linked to the second byte;

receiving, from the third device in response to the second API call and via internet communications, a second state element stored in a third structured database maintained by the third device;

comparing the second state element from the third structured database with a third state element corresponding to the second byte in the first structured database;

transmitting, to a user device of a user, a request for a new value corresponding to the second unique data field based on the comparison;

receiving, from the user device, the new value corresponding to the second unique data field; and overwriting the second unique data field with the new value received from the user device thereby triggering a second mutation to a third state element corresponding to the second unique data field linked to the second byte.

2. The method of claim 1, wherein each state element comprises a recency element corresponding to mutation timing for each corresponding unique data field.

3. The method of claim 1, wherein comparing the second state element with a third state element comprises determining whether a mutation timing criterion is satisfied.

4. The method of claim 1, wherein comparing the second state element with a third state element comprises comparing a first recency element of the second state element with a second recency element of the third state element.

5. The method of claim 4, wherein the request is transmitted to the user device only if the comparing indicates a more recent mutation in the second structured database than in the first structured database for the second unique data field.

6. The method of claim 1, wherein each immutable byte comprises a unique identifier for its corresponding unique data field.

7. The method of claim 1, wherein each state element comprises a first data element indicating whether its corresponding unique data field has mutated and a second data element indicating a recency of the mutation.

8. The method of claim 7, wherein the second data element is a mutation date.

9. The method of claim 7, wherein the second data element is time elapsed since the mutation.

10. The method of claim 7, wherein the second data element is a date range.

11. The method of claim 1, wherein each immutable byte is further linked to a mutable activation element, and wherein the first structured database is queried to determine, for the first byte, that a first activation element corresponding to the first byte enables state data pulls from the second device of the second entity prior to transmitting the first state element to the second device in response to the first API call.

12. The method of claim 11, wherein each activation element indicates whether data pull calls are enabled for one or more entity devices or whether data pushes are enabled for the one or more entity devices.

13. The method of claim 12, wherein for each entity device for which data pushes are enabled, the corresponding activation element further indicates a frequency of data pushes to the entity device.

14. The method of claim 1, further comprising presenting a graphical user interface via the user device, receiving selections to change data pull rights via the graphical user interface, and updating corresponding activation elements according to the selections.

* * * * *